US008913485B2

United States Patent
Lu et al.

(10) Patent No.: US 8,913,485 B2
(45) Date of Patent: Dec. 16, 2014

(54) OPEN SHORTEST PATH FIRST (OSPF) NONSTOP ROUTING (NSR) WITH LINK DERIVATION

(75) Inventors: Wenhu Lu, San Jose, CA (US); Ing-Wher Chen, San Jose, CA (US); Alfred C. Lindem, III, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 408 days.

(21) Appl. No.: 13/350,234

(22) Filed: Jan. 13, 2012

(65) Prior Publication Data

US 2013/0070604 A1  Mar. 21, 2013

Related U.S. Application Data

(60) Provisional application No. 61/543,218, filed on Oct. 4, 2011, provisional application No. 61/535,938, filed (Continued)

(51) Int. Cl.
| | | |
|---|---|---|
| *H04L 12/713* | (2013.01) | |
| *H04L 12/757* | (2013.01) | |
| *H04L 12/755* | (2013.01) | |
| *H04L 12/751* | (2013.01) | |
| *H04L 12/703* | (2013.01) | |

(52) U.S. Cl.
CPC ............ *H04L 45/586* (2013.01); *H04L 45/021* (2013.01); *H04L 45/026* (2013.01); *H04L 45/28* (2013.01)
USPC ........... 370/219; 709/238; 709/242; 370/255; 370/351

(58) Field of Classification Search
None
See application file for complete search history.

(56) References Cited

U.S. PATENT DOCUMENTS

| 6,856,627 B2 | 2/2005 | Saleh et al. |
| 6,950,427 B1 | 9/2005 | Zinin |

(Continued)

FOREIGN PATENT DOCUMENTS

EP  1365551 A1  11/2003

OTHER PUBLICATIONS

Chia-Tai Tsai, Rong-Hong Jan, Chien Chen, and Chia-Yuan Huang. 2007. Implementation of Highly Available OSPF Router on ATCA. In Proceedings of the 13th Pacific Rim International Symposium on Dependable Computing (PRDC '07). IEEE Computer Society, Washington, DC, USA, 147-154. DOI=10.1109/PRDC.2007.42 http://dx.doi.org/10.1109/PRDC.2007.42.*

(Continued)

*Primary Examiner* — Phirin Sam
*Assistant Examiner* — Tarell Hampton (57) ABSTRACT

OSPF NSR with link derivation synchronization is described. When a network element having an active OSPF instance and a standby OSPF instance attempts to create a FULL adjacency with a neighbor network element using a neighbor data structure of the active OSPF instance, and if and when a switch causes the second OSPF instance to act as the active OSPF instance, neighbor information is retrieved from the LSAs of the standby OSPF instance and a link is derived between the network element and the neighbor network element based on the retrieved neighbor information. In one embodiment, the standby OSPF instance retrieves virtual neighbor information from its LSAs and derives a virtual link between the network element and the neighbor network element based on the retrieved virtual neighbor information without having to synchronize the neighbor information between the active and standby OSPF instance.

30 Claims, 7 Drawing Sheets

Related U.S. Application Data on Sep. 16, 2011, provisional application No. 61/535,942, filed on Sep. 16, 2011, provisional application No. 61/541,064, filed on Sep. 29, 2011, provisional application No. 61/541,065, filed on Sep. 29, 2011, provisional application No. 61/541,067, filed on Sep. 29, 2011, provisional application No. 61/541,069, filed on Sep. 29, 2011, provisional application No. 61/541,072, filed on Sep. 29, 2011, provisional application No. 61/542,065, filed on Sep. 30, 2011.

(56) References Cited

U.S. PATENT DOCUMENTS

| | | |
|---|---|---|
| 6,980,537 B1 | 12/2005 | Liu |
| 6,985,959 B1 | 1/2006 | Lee |
| 7,065,059 B1 | 6/2006 | Zinin et al. |
| 7,095,747 B2 | 8/2006 | Sarmiento et al. |
| 7,117,241 B2 | 10/2006 | Bloch et al. |
| 7,248,579 B1 | 7/2007 | Friedman |
| 7,292,535 B2 | 11/2007 | Folkes et al. |
| 7,363,387 B1 | 4/2008 | Chandra et al. |
| 7,391,730 B1 | 6/2008 | Chandra et al. |
| 7,573,811 B2 | 8/2009 | Koppol |
| 7,639,680 B1 | 12/2009 | Roy et al. |
| 7,787,364 B2 | 8/2010 | Maeda et al. |
| 7,804,770 B2 | 9/2010 | Ng |
| 7,940,650 B1 | 5/2011 | Sandhir et al. |
| 8,199,646 B1 | 6/2012 | Cain |
| 8,428,003 B1 | 4/2013 | Chen et al. |
| 2002/0191616 A1 | 12/2002 | Sarmiento et al. |
| 2002/0196794 A1 | 12/2002 | Bloch et al. |
| 2003/0056138 A1 | 3/2003 | Ren |
| 2003/0218982 A1 | 11/2003 | Folkes et al. |
| 2004/0042395 A1 | 3/2004 | Lu et al. |
| 2004/0136371 A1 | 7/2004 | Muralidhar et al. |
| 2005/0105524 A1 | 5/2005 | Stevens et al. |
| 2005/0265260 A1 | 12/2005 | Zinin et al. |
| 2005/0265346 A1 * | 12/2005 | Ho et al. ........................ 370/392 |
| 2006/0215547 A1 | 9/2006 | Koppol |
| 2007/0245034 A1 | 10/2007 | Retana et al. |
| 2008/0056294 A1 | 3/2008 | Maeda et al. |
| 2009/0086622 A1 | 4/2009 | Ng |
| 2009/0116514 A1 * | 5/2009 | Yan et al. ........................ 370/509 |
| 2009/0129398 A1 | 5/2009 | Riegel et al. |
| 2009/0279536 A1 | 11/2009 | Unbehagen et al. |
| 2009/0288098 A1 | 11/2009 | Abd-El-Malek et al. |
| 2010/0054153 A1 | 3/2010 | White et al. |
| 2010/0254262 A1 | 10/2010 | Kantawala et al. |
| 2011/0026460 A1 | 2/2011 | Lafuente |
| 2011/0231578 A1 * | 9/2011 | Nagappan et al. ............ 709/248 |
| 2013/0070604 A1 | 3/2013 | Lu et al. |
| 2013/0070637 A1 | 3/2013 | Lindem et al. |
| 2013/0073741 A1 | 3/2013 | Lindem et al. |
| 2013/0083802 A1 | 4/2013 | Chen et al. |

OTHER PUBLICATIONS

The European Search Report dated Jan. 7, 2013 from the European Patent Application No. 12184028.4, pp. 1-6.

OSPF NSR, Cisco Systems, Inc., Jun. 10, 2011, 6 pages.

J. Moy, OSPF Version 2, Network Working Group, Request for Comments: 2328, Apr. 1998, 245 pages.

* cited by examiner

```
1. if (NBR_k transitions to FULL) {
2.    if (NBR_k is not over a virtual link) {
3.       send NBR_k FULL to OSPF_STANDBY_INSTANCE
4.    }
5.    /* Normal NBR_k FULL processing continued */
6. }
7. if (NBR_k transitions from FULL) {
8.    send (NBR_k DOWN to OSPF_STANDBY_INSTANCE
9.    /* Normal NBR_k not FULL processing */
10. }
```

FIG. 7

```
a. for each (Router_LSA_k) {
b.    for each (link_m) {
c.       if (link_m is of type 4) {
d.          bring up associated
e.          virtual link interface and neighbor
f.       }
g.    }
h. }
```

FIG. 8

OPEN SHORTEST PATH FIRST (OSPF) NONSTOP ROUTING (NSR) WITH LINK DERIVATION

CROSS-REFERENCE TO RELATED APPLICATIONS

This application claims the benefit of U.S. Provisional Application No. 61/543,218, filed Oct. 4, 2011, which is hereby incorporated by reference in its entirety.

This application also claims the benefit of U.S. Provisional Application No. 61/535,938, filed Sep. 16, 2011, which is hereby incorporated by reference in its entirety.

This application also claims the benefit of U.S. Provisional Application No. 61/535,942, filed Sep. 16, 2011, which is hereby incorporated by reference in its entirety.

This application also claims the benefit of U.S. Provisional Application No. 61/541,064, filed Sep. 29, 2011, which is hereby incorporated by reference in its entirety.

This application also claims the benefit of U.S. Provisional Application No. 61/541,065, filed Sep. 29, 2011, which is hereby incorporated by reference in its entirety.

This application also claims the benefit of U.S. Provisional Application No. 61/541,067, filed Sep. 29, 2011, which is hereby incorporated by reference in its entirety.

This application also claims the benefit of U.S. Provisional Application No. 61/541,069, filed Sep. 29, 2011, which is hereby incorporated by reference in its entirety.

This application also claims the benefit of U.S. Provisional Application No. 61/541,072, filed Sep. 29, 2011, which is hereby incorporated by reference in its entirety.

This application also claims the benefit of U.S. Provisional Application No. 61/542,065, filed Sep. 30, 2011, which is hereby incorporated by reference in its entirety.

FIELD

Embodiments of the invention relate to the field of computer networking; and more specifically, to Nonstop Routing (NSR) using the Open Shortest Path First (OSPF) protocol, as defined in RFC 2328, with link derivation.

BACKGROUND

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over a larger geographic area using links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or interior gateway) protocol (IGP). An example of such a protocol is the Open Shortest Path First (OSPF) routing protocol described in *Request for Comments (RFC)* 2328, *OSPF Version 2*, by J. Moy (1998). The OSPF protocol is based on link-state technology, and, therefore, each router participating in an autonomous system (AS) maintains an identical link state database (LSDB) describing the topology of the AS.

SUMMARY

Open Shortest Path First (OSPF) Nonstop Routing (NSR) with link derivation is described. According to one embodiment of the invention, a network element includes a first OSPF instance currently acting as an active OSPF instance and a second OSPF instance currently acting as a standby OSPF instance. The network element attempts to create a FULL adjacency with a neighbor network element using a neighbor state machine of the active OSPF instance. This attempt includes: maintaining a neighbor data structure for the neighbor network element prior to the neighbor state machine transitioning to or from FULL state, and installing link state advertisements (LSAs) received from the neighbor network element in both a link state database (LSDB) of the active OSPF instance and the standby OSPF instance. If and when a switch causes the second OSPF instance to act as the active OSPF instance, the method includes the further step of retrieving neighbor information from the LSAs of the standby OSPF instance and deriving a link between the network element and the neighbor network element based on the retrieved neighbor information.

In one embodiment, if and when the standby OSPF instance assumes the role of the active OSPF instance, then the standby OSPF instance retrieves virtual neighbor information from its LSAs and derives a virtual link between the network element and the neighbor network element based on the retrieved virtual neighbor information. For purposes of this application, a virtual neighbor includes, but is not limited to, a neighbor established across a virtual link. In one embodiment, the newly active OSPF instance may look for Router-LSA type 4 links (as described in OSPF protocol RFC 2328, Appendix A.4), which describe virtual links, and create the associated interface and neighbor. In this manner, a virtual link between the network element and a neighbor network element may be derived or created without having to synchronize the neighbor information between the original active OSPF instance and the standby OSPF instance which has become active.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), Label Distribution Protocol (LDP), Resource Reservation Protocol (RSVP)) that communicate with other network elements to exchange routes and select those routes based on one or more routing metrics.

Neighboring network elements (or "neighbors") are two network elements that have interfaces to a common network, wherein an interface is a connection between a network element and one of its attached networks. The Hello protocol ensures that communication between neighbors is bi-directional by periodically sending Hello packets out of all of the network element interfaces. Bi-directional communication is indicated when the network element "sees" itself listed in the neighbor's Hello packet. On broadcast and non-broadcast multi-access (NBMA) networks, the Hello protocol elects a designated router (DR) and backup designated router (BDR) for the network.

An adjacency is a relationship formed between selected neighboring network elements for the purpose of exchanging routing information and abstracting the network topology. One or more network element adjacencies may be established over an interface. Not every pair of neighboring network elements becomes adjacent. As part of bringing up an adjacency, the network elements exchange routing information by sending each other link state requests (LSRs) and receiving in reply link state advertisements (LSAs), containing the status of the interface and adjacency information. Because adjacency information is contained in LSAs, the protocol can detect dead network elements in a timely fashion.

Within a given network element, neighbor network elements are reflected in a neighbor data structure, which contains all information pertinent to a forming or formed adjacency between the two neighbors. The state in the neighbor data structure is maintained by a neighbor state machine (NSM). This neighbor data structure includes, among other data, a description of the state of the neighbor conversation (in a neighbor state field) and several lists of LSAs: a retransmission list, a complete list of LSAs that make up the area link-state database (the database summary list), and a list of LSAs that must be received from the neighbor in order to synchronize the two neighbors' databases (the LSR list), where such synchronization is required.

For greater reliability, a single network element acting as an OSPF network element may use a technique called Nonstop Routing (NSR), in which information is synchronized between a first OSPF instance and a second OSPF instance within the single network element; one of the OSPF instances acts as the active OSPF instance and the other acts as a standby OSPF instance. In this case, a failure of the active OSPF instance and switchover to the standby OSPF instance does not result in any loss of OSPF protocol synchronization.

Every network element implementing OSPF runs a link state routing protocol that maintains an identical link state database (LSDB) describing the topology of the autonomous system (AS) in which it resides. Each individual piece of the LSDB is a particular network element's local state, e.g., the network element's usable interfaces and reachable neighbors or adjacencies. As used herein, neighboring network elements (or "neighbors") are two network elements that have interfaces to a common network, wherein an interface is a connection between a network element and one of its attached networks. Moreover, an adjacency is a relationship formed between selected neighboring network elements for the purpose of exchanging routing information and abstracting the network topology. One or more network element adjacencies may be established over an interface.

The adjacencies are established and maintained through the use of the well-known Hello protocol. Broadly stated, the Hello protocol ensures that communication between neighbors is bi-directional by periodically sending Hello packets out of all of the network element interfaces. Bi-directional communication is indicated when the network element "sees" itself listed in the neighbor's Hello packet. On broadcast and non-broadcast multi-access (NBMA) networks, the Hello protocol elects a designated router (DR) and backup designated router (BDR) for the network.

Once a network element establishes an adjacency, it notifies other network elements on the network by sending link state advertisements (LSAs). These LSAs are distributed through a process called reliable flooding, in which a router forwards an LSA its neighbor network element(s) and receipt of the LSA is acknowledged by the receiving neighbor network element(s). By way of a specific example, a first network element that originates an LSA forwards that LSA to all of its neighboring network elements. As another example, a first network element that receives a new instance of an LSA from a second network element forwards that LSA to all of its neighboring network elements with the exception of the second network element. The first network element maintains a retransmission list for each network element (neighbor) to which it is in exchange state or above. For each network element to which the LSA has been forwarded, the first network element adds the LSA to the retransmission list associated with that. When the first network element receives an acknowledgment for the LSA from a particular network element, the LSA is removed from that network element's retransmission list. If a network element fails to acknowledge the LSA within a specified time and therefore the LSA remains on that router's retransmission list, the LSA is retransmitted to that network element. This process repeats until the retransmission lists are empty.

As mentioned above, for greater reliability, some OSPF implementations use a technique called Nonstop Routing (NSR), in which state is synchronized between an active and standby OSPF instances to assure that a failure of the active OSPF instance and switchover to the standby OSPF instance does not result in any loss of OSPF protocol synchronization.

This OSPF synchronization requires that before an acknowledgement to an LSA (LSA Ack) is sent to a neighbor network element from which the LSA was received, the LSA must be processed and acknowledged by the standby OSPF instance to ensure that the state of the standby OSPF instance is synchronized with the active OSPF instance before the acknowledgement is sent to the neighbor network element.

The active OSPF instance can receive duplicate LSAs, and the OSPF protocol mandates that all LSAs need to be acknowledged (using LSA Ack). One example scenario that will cause an active OSPF instance to receive duplicate LSAs is where the active OSPF instance has two neighbors that have identical LSDBs. If the active OSPF instance reboots, it will attempt to establish adjacency with its two neighbors at roughly the same time, sending the same link state requests (LSRs) to each of its neighbors and receiving identical LSAs in response. One copy will arrive first and will be determined to be a new instance (in this case it's in fact brand new) and be flagged and synchronized to the standby. When the second copy is received, an LSA Ack can be immediately sent out if it's already been synchronized to the standby OSPF instance. If the LSA in the LSDB is still flagged, indicating that it's still waiting to be synchronized, then the LSA Ack will be delayed.

State must be synchronized between OSPF instances using Inter-Process Communication (IPC), which is much slower than normal memory access. Hence, the amount of state which is synchronized must be minimized and the number of IPC messages used for synchronization can significantly impact the network element. Each received LSA is acknowledged in an LSA acknowledgement (LSA Ack) message. This acknowledgement process utilizes significant computational resources and IPC memory usage for separately synchronizing each LSA between the active OSPF instance and standby OSPF instance. Each new instance of an LSA must be synchronized from the active OSPF to the standby OSPF instance. The active OSPF flags these LSAs in the LSDB that are waiting to be synchronized to the standby OSPF instance, and then as many of these LSAs as possible are packed into a single IPC message and sent to the standby OSPF instance. For each received LSA, an acknowledgment must be sent from the standby OSPF instance to the active OSPF instance, though several acknowledgments can be packed into a single IPC message and sent to the active OSPF instance. In addition, for each acknowledgment, the active OSPF instance must perform a lookup operation in the link state database (LSDB) to unflag the acknowledged LSA, so that the active OSPF instance can subsequently send an acknowledgment (LSA Ack) to the neighbor network element.

As discussed herein above, a network element (e.g., a router) that implements NSR includes at least two OSPF instances, where a first one acts as an active OSPF instance (or sometimes referred to as a primary OSPF instance) and the second one acts as a standby OSPF instance (or sometimes referred to as a backup OSPF instance or secondary OSPF instance). The active and standby OSPF instances may be executed by routing processors (RPs) on different hardware or the same hardware. For example, one of the OSPF instances may be executed by an RP on a first control card while the other OSPF instance is executed by an RP on a second control card. As another example, the OSPF instances may be executing on different cores of a single processor. As yet another example, the OSPF instances may be running on different processors on the same card. The two OSPF instances must remain synchronized such that if the active OSPF instance fails at any point in time, the standby OSPF instance can be activated and gracefully take over for the failed OSPF instance.

Further, the implementation of the two OSPF instances has reliability, speed, efficiency and error handling. (1) Reliability—the active OSPF instance needs to make sure that its standby OSPF counterpart does receive the information sent by the active OSPF instance. At least the active OSPF instance should be aware of whether the standby OSPF instance gets the data so that it can take appropriate action. A de facto method is that the standby OSPF instance sends acknowledgment (ACK) messages back to the active OSPF instance through inter-process communication (IPC). (2) Speed—the active OSPF instance often is required to put on hold its protocol activities to allow the completion of its database synchronization. One example is that the active OSPF instance delays its LSA acknowledgment to the neighboring network element until it learns that the standby OSPF instance has received the copy of the same LSA. (3) Efficiency—since the database is the largest piece of OSPF data, and the two-way communication between the active OSPF instance and the standby OSPF instance has to cover all the transactions, both the active OSPF instance and the standby OSPF instance will be very busy when the link state database becomes large. When the active OSPF instance receives an acknowledgement (ACK) from the standby OSPF instance, it has to find out which LSA the ACK is for. This invokes the LSA lookup function which is costly and can have an impact on a routing processor's normal functionalities. (4) Error handling—when a configuration changes, or system state changes, or similar cause of error or change occurs, the active OSPF instance and the standby OSPF instance may go out of sync. In particular the active OSPF instance may find that an LSA ACK from the standby OSPF instance does not exist in its database.

The disadvantages of the prior art include performing synchronization for each and every LSA between the active OSPF instance and the standby OSPF instance. It is difficult to maintain the reliabilities without compromising the NSR speed, efficiency and error handling. And the problem becomes more severe when OSPF is deployed in a sizable network. In fact, the database size does not have to be very large. If a database has about 100,000 routes (where most are redistributed routes), the synchronization can take a few seconds and show an impact on the normal OSPF processes' protocol activities.

The embodiments of the invention overcome these disadvantages of the prior art concerning the virtual links. The embodiments reduce the need to perform synchronization where neighbor information is readily available in the LSA data structures of the active and standby OSPF instances, thereby reducing routing processor time devoted to synchronization. Since FULL virtual neighbor information is readily available in the OSPF LSA data structure (RFC 2328 Section 12.4.1.3), and the LSAs already have an established channel in the OSPF NSR communication, the standby OSPF instance can directly retrieve the virtual neighbor information. By the standby OSPF instance retrieving the neighbor information from the LSA rather than synchronizing with the active OSPF instance, timely delivery/update is guaranteed, as well as data consistency, and implicitly the SPF status. Making use of the neighbor information in the LSA not only simplifies the NSR design and handling, it also avoids possible virtual neighbor flapping in existing solutions where right after a switchover the virtual neighbor records may not match the ones in the Router LSA.

Figure 1:
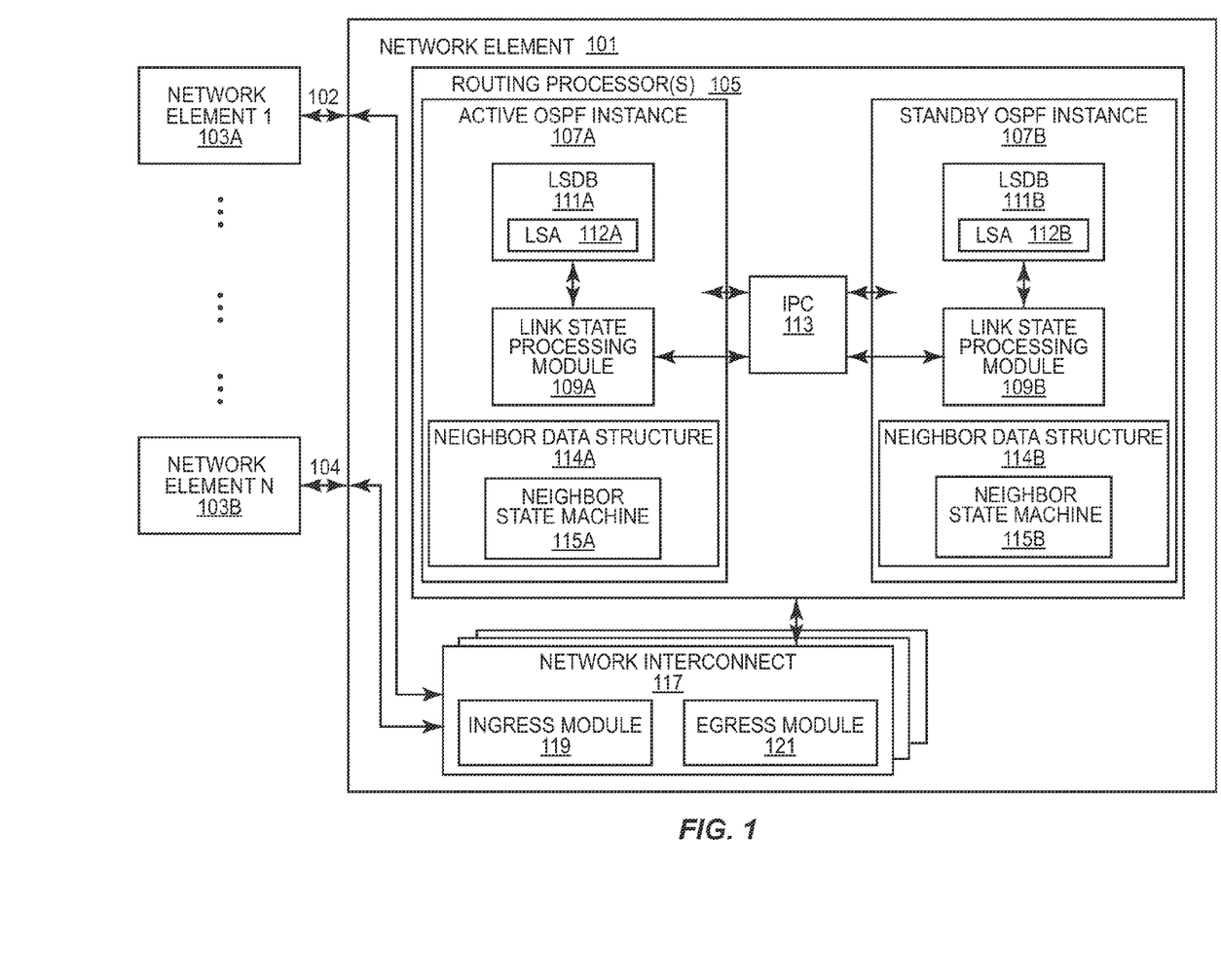
FIG. 1 is a diagram of an exemplary network element and network that implements OSPF Nonstop Routing (NSR) link derivation.

FIG. 1 is a diagram of one embodiment of an exemplary network element and network that implements OSPF Non-stop Routing (NSR) with link derivation. In one embodiment, the network element is capable of having a neighbor relationship with another network element over a virtual link. The network includes a network element 101 connected to any number 1-N of other network elements 103A-103B through a set of network interconnect 117. The network element 101 includes a set of routing processors 105 executing the OSPF instances 107A and 107B, where the OSPF instance 107A is currently acting as the active OSPF instance and the OSPF instance 107B is currently acting as the standby OSPF instance in an NSR implementation. A 'set,' as used herein, refers to any positive whole number of items including one item. For purposes of this description, the first OSPF instance 107A may also be referred to as the active OSPF instance 107A and the second OSPF instance 107B may be referred to as the standby OSPF instance 107B.

Each network interconnect 117 can include an ingress module 119 and an egress module 121. The ingress module 119 handles incoming data traffic at the physical and link level and provides this data to the routing processor 105 for further processing. Similarly, the egress module 121 handles outgoing data traffic at the physical and link level to transmit it to other devices over a connected network link. These two modules function together to enable communication with other devices over a set of networks. The network interconnect 117 can be on the same line card as the routing processor 105 or separate from the routing processor 105, part of the same integrated circuit (IC) or similarly connected with the routing processor 105 within the network element 101.

In one embodiment, the network element 101 receives LSA 112A from the network element 103A over a link managed by network interconnect 117. The active OSPF instance 107A processes the received LSA 112A in a link state processing module 109A including storing the information from the LSA 112A into its LSDB 111A LSDB 111B. In addition, the active OSPF instance 107A may also synchronize the received LSA 112A with the standby OSPF instance 107B (the standby OSPF instance 107B then stores the information 112B in the LSA into its LSDB 111B). The network element 101 can also originate LSAs (self-originated LSAs) to transmit to its neighboring network elements, and these LSAs may also be synchronized to the standby OSPF instance 107B.

The synchronization between the active OSPF instance 107A and the standby OSPF instance 107B can utilize IPC 113, which operates through a shared memory or similar communication mechanism to provide a single channel of communication between the active OSPF instance 107A and the standby OSPF instance 107B. IPC 113 is a process executed by the routing processor 105. IPC 113 operates as a first in first out (FIFO) communication mechanism.

The LSAs 112A are also entered into the LSDB 111A prior to or in parallel with the sending of the received LSAs to the standby OSPF instance 107B. The LSAs sent to the standby OSPF instance 107B may also be stored in an LSDB 111B. In one embodiment, the standby sends one IPC message to the active OSPF instance acknowledging for each received IPC message containing a set of LSAs from the active OSPF instance 107A. The last LSA in each received IPC message is acknowledged.

The first OSPF instance 107A may also include a neighbor data structure 114A, which may also include a neighbor state machine (NSM) 115A. The second OSPF instance 107B includes a neighbor data structure 114B, which may also include a neighbor state machine (NSM) 115B. The NSMs 115A and 115B implement the states from OSPF version 2, including but not limited to Down, Exchange Start, Exchange, Loading, and Full. The NSM states that are less than the Full state are referred to as transitional states. The NSM 115A operate to bring up in the network element 101 an adjacency with another network element (such as 103A or 103B) as a neighbor. The Exchange Start, Exchange, Loading, and Full states are referred to as the states that bring up the adjacency. In addition, a neighbor data structure for the neighbor is maintained by the first OSPF instance 107A. The neighbor data structure may include a neighbor state field which is updated to reflect the state of the NSM 115A, as well as other information per OSPF version 2.

When a switchover occurs, the newly active OSPF instance 107B operates as the active OSPF instance 107A is described herein. For sake of clarity, an example of a functioning active OSPF instance 107A and standby OSPF instance 107B prior to any switchover is described herein. One skilled in the art would understand that the structures and functions described herein can operate to support any number of switchovers between the OSPF instances 107A, 107B.

Figure 2:
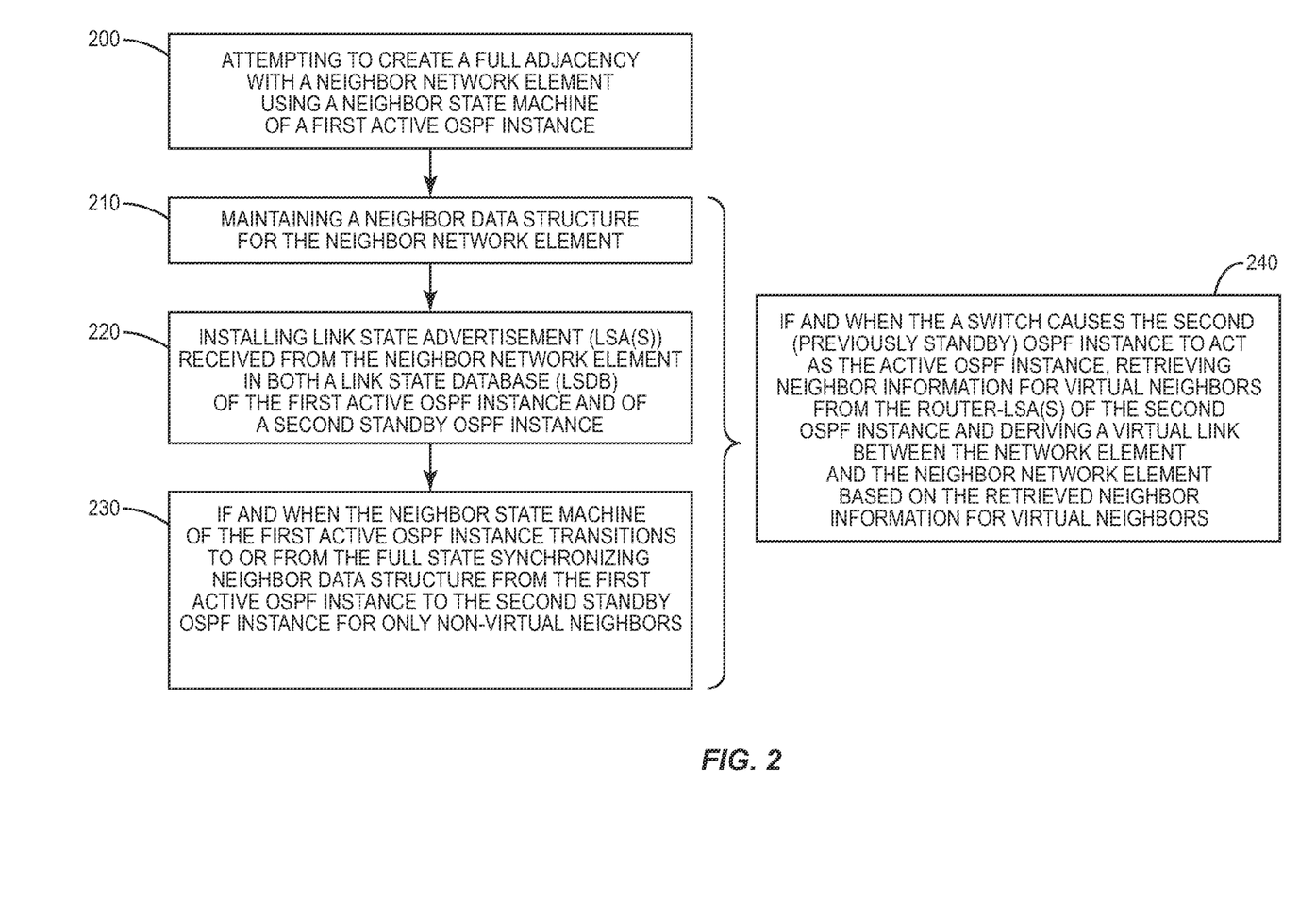
FIG. 2 is a flow diagram of one embodiment of a process of deriving a link for a standby OSPF instance using Router link state advertisements (LSAs).

FIG. 2 is a flow diagram of one embodiment of a process of deriving a link for a standby OSPF instance using link state advertisements (LSAs) according to one embodiment. The embodiment shown in FIG. 2 is for deriving a virtual link using Router-LSAs, but other types of links may be derived using a similar process. The flow diagram of FIG. 2 is performed when attempting to bring up an adjacency with a neighbor network element using a neighbor state machine of the active OSPF instance (block 200). From block 200, control passes to block 210. As shown in FIG. 2, the attempt includes maintaining a neighbor data structure for the neighbor network element (block 210) and installing LSAs received from the neighbor network element in both a LSDB of the active OSPF instance and the standby OSPF instance (block 220). In one embodiment, in an optional step 230, if and when the neighbor state machine of the active OSPF instance transitions to FULL state, then the following may occur: synchronizing the neighbor data structure from the active OSPF instance to the standby OSPF instance. In one embodiment, the neighbor data structure from the active OSPF instance is synchronized to the standby OSPF instance only for non-virtual neighbors.

FIG. 2 also shows that block 240 may be performed at any point between blocks 210 and 230. Block 240 illustrates that, if and when a switch causes the second OSPF instance to act as the active OSPF instance and the neighbor state machine transitions to or from a full state, the method responds by retrieving neighbor information from the Router-LSAs of the standby OSPF instance (which has just become the active OSPF instance) and deriving a link between the network element and the neighbor network element based on the retrieved neighbor information from the LSAs. In one embodiment, as shown in block 240, if and when a switch causes the second OSPF instance to act as the active OSPF instance and the neighbor state machine transitions to or from a full state, the method may include retrieving virtual neighbor information from the Router-LSAs of the standby OSPF instance (which has just become the active OSPF instance) and deriving a virtual link between the network element and the neighbor network element based on the retrieved neighbor information from the LSAs for the neighbors associated with a virtual link.

In this manner, the method allows the router or other network element LSA to handle virtual links at the last possible moment by retrieving the FULL virtual neighbor information that is readily available in the OSPF LSA data structure. This minimizes the time that the standby OSPF instance becomes active, which negates the need for synchronization of neighbors over virtual links, which in turn greatly reduces cleaning up data structures and reconciling different messages that come through at different times that nevertheless are related. Unlike other types of neighbors, FULL virtual neighbor information is readily available in the OSPF LSA data structure (RFC 2328 Section 12.4.1.3). Since the LSAs already have an established channel in the OSPF NSR communication, the standby OSPF instance can directly retrieve the virtual neighbor information and will be guaranteed with timely delivery/update and with the data consistency compared to LSA contents, and implicitly the SPF status. The router LSA is an unheeded and overlooked source of virtual link information. Making use of it not only simplifies the NSR design and handling, it also avoids possible virtual neighbor flapping in existing solutions where right after a switchover the virtual neighbor records may not match the ones in Router-LSA.

Figure 3:
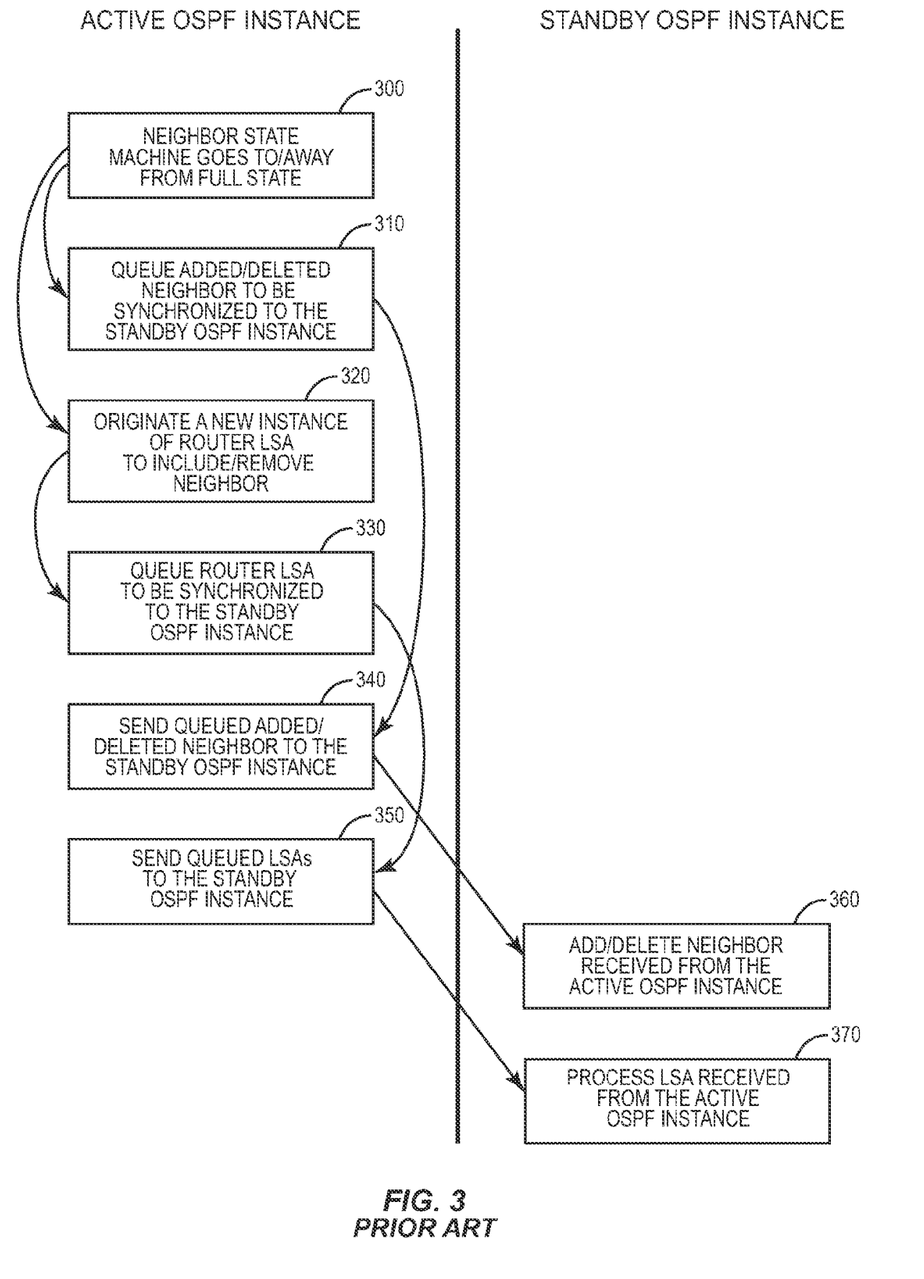
FIG. 3 (Prior Art) is a diagram of a typical set of operations performed by an active OSPF instance and a standby OSPF instance prior to a switchover from the active OSPF instance to the standby OSPF instance.
Figure 4:
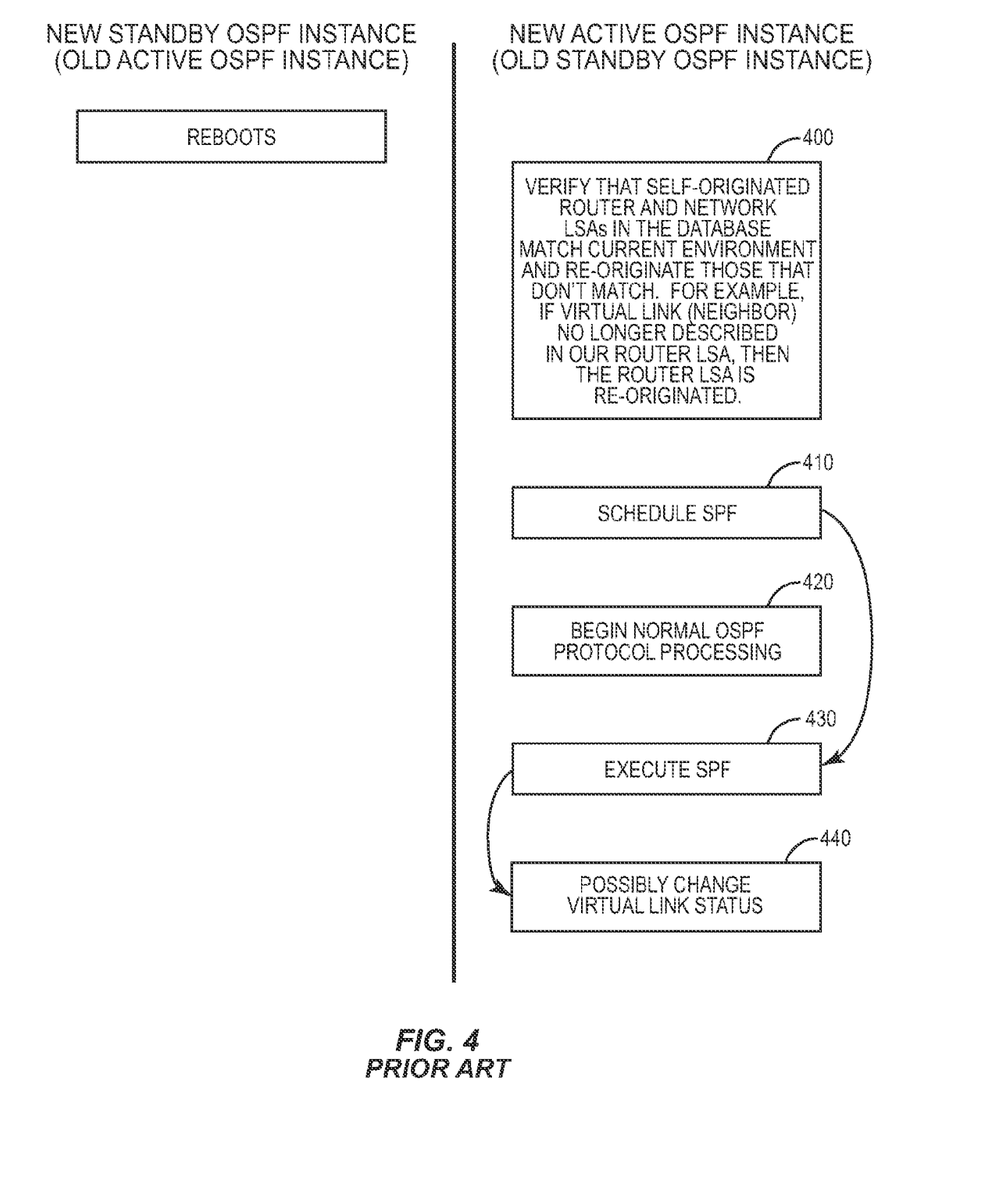
FIG. 4 (Prior Art) is a diagram of a typical set of operations performed by an active OSPF instance and a standby OSPF instance after a switchover from the active OSPF instance to the standby OSPF instance.

FIG. 3 (Prior Art) is a diagram of a typical set of operations performed by an active OSPF instance and a standby OSPF instance prior to a switchover from the active OSPF instance to the standby OSPF instance. FIG. 4 (Prior Art) is a diagram of a typical set of operations performed by an active OSPF instance and a standby OSPF instance after a switchover from the active OSPF instance to the standby OSPF instance.

Before discussing the typical set of operations performed by an active OSPF instance and a standby OSPF instance in FIGS. 3 and 4, a brief background on nonstop routing (NSR) is provided. In providing NSR, an active OSPF instance typically informs a standby OSPF instance when a neighbor transitions to or from the FULL state.

The OSPF routing protocol defines a special type of interface called a virtual link (RFC 2328 Section 15). A virtual link is a virtual interface and a neighbor established over a virtual link is the product of shortest-path-first (SPF) computation. Unlike physical interfaces, a virtual link becomes active and begins to build an adjacency after the SPF calculation indicates that there is indeed a valid physical connection. However, once the SPF calculation determines the valid connection, neighbors over the virtual link are established in the same manner as neighbors over physical links, resulting in a virtual link interface which is considered operational or in the up state. At this point, the natural approach is to synchronize the newly adjacent neighbor from the active OSPF instance to the standby OSPF instance.

This is seen in FIGS. 3 and 4. Referring to FIG. 3, a first OSPF instance is the active OSPF instance (see, e.g., active OSPF instance 107A in FIG. 1) and a second OSPF instance is the backup OSPF instance (see, e.g., backup OSPF instance 107B in FIG. 1). In block 300, the neighbor state machine, such as neighbor state machine 115A in FIG. 1, goes to or away from a FULL state. The added or deleted neighbor is placed in a queue for later synchronization with the standby OSPF instance (block 310). In addition, a new instance of the Router-LSA is originated to include or remove the neighbor (block 320). The new instance of the Router-LSA is queued to be synchronized to the standby OSPF instance (block 330). At some point in time, the queued added/deleted neighbor information from block 310 may be sent to the standby OSPF instance (block 340). In addition, the queued LSAs from block 330 are sent to the standby OSPF instance (block 350). As seen in block 360, the standby OSPF instance then adds or deletes the neighbor received from the active OSPF instance and stores the neighbor information in its neighbor data structure, such as the neighbor data structure containing neighbor state machine 115B (see FIG. 1). Likewise, block 370 illustrates that the standby OSPF instance processes the LSAs sent from the active OSPF instance (block 350). In one embodiment, the received LSAs may be stored in a LSDB, such as LSDB 111B in FIG. 1.

Now referring to FIG. 4, in the existing OSPF NSR method, when a switch or other event happens to cause the standby OSPF instance to become the active OSPF instance, the previously active OSPF instance reboots and becomes the new standby OSPF instance. The former standby OSPF instance in block 400 becomes active, verifies that the self-originated Router-LSA and the Network-LSAs in its LSDB 111B match the current environment, and re-originates those LSAs that do not match. For example, in one embodiment, if a virtual link (virtual neighbor) is no longer described in the router LSA, then the Router-LSA would be re-originated (block 400). The standby OSPF instance may then proceed with scheduling the shortest path first (SPF) calculation (block 410) and begin normal OSPF protocol processing (block 420). The SPF calculation will be executed (block 430). In the normal course of OSPF, the status of the virtual link may change (block 440).

The existing solution as seen in FIGS. 3 and 4 suffers from delays in neighbor synchronization and is susceptible to race condition problems that will require special mechanisms to deal with all kinds of event orders. A FULL neighbor must take the following steps to be established over a physical interface and to be synchronized to the standby OSPF instance:

1. Physical interface activated.
2. Discover a neighbor, and go through INIT, 1-way, 2-way-, exchange, ex-start, loading, and FULL states.
3. Synchronize FULL neighbor to the standby OSPF instance.

In contrast, a FULL neighbor over a virtual link takes the following steps to be established:

1. Physical interface activated.
2. Discover a neighbor, and go through INIT, 1-way, 2-way, exchange, ex-start, loading, and FULL states. Routers in the transit area become up-and-running.
3. SPF calculation determines that the virtual link should be considered operational or in the Up state.
4. Newly activated virtual link discovers neighbor and goes through INIT, 1-way, 2-way, exchange, ex-start, loading, and FULL states.
5. Synchronize FULL virtual neighbor to the standby OSPF instance.

Similar extra steps also occur when a neighbor goes from FULL to not FULL, and the change from FULL state also needs to be synchronized to the standby OSPF instance. Due to the additional intermediate events, the existing approach suffers from delays in neighbor synchronization.

Additionally, because a virtual neighbor is an artifact of SPF, which itself is a product of LSAs, the existing approach consists of two sources for virtual neighbors, which easily results in inconsistent data. In the existing approach, the standby OSPF instance creates the FULL virtual neighbor in step 5 above. However, because all the relevant LSAs might have been received by the standby OSPF instance in step 2, an SPF calculation by the standby OSPF instance will also create the virtual neighbor.

A similar sequence of events, mostly in reverse, occurs when the neighbor goes away from FULL state, and similar race conditions may exist.

To avoid the problems of the existing approach, the method described above in FIG. 2 and in more detail below in FIGS. 5 and 6 may be used. Unlike other types of neighbors, FULL virtual neighbor information is readily available in the OSPF Router-LSAs (RFC 2328 Section 12.4.1.3). Since the LSAs already have an established channel in the OSPF NSR communication, the standby can directly retrieve the virtual neighbor information and will be guaranteed with timely delivery/update and with the data consistency compared to LSA contents, and implicitly the SPF status. The Router-LSA is an unheeded and overlooked source of virtual link information. Making use of it not only simplifies the NSR design and handling, it also avoids possible virtual neighbor flapping in existing solutions where right after a switchover the virtual neighbor records may not match the ones in Router-LSA.

Figure 5:
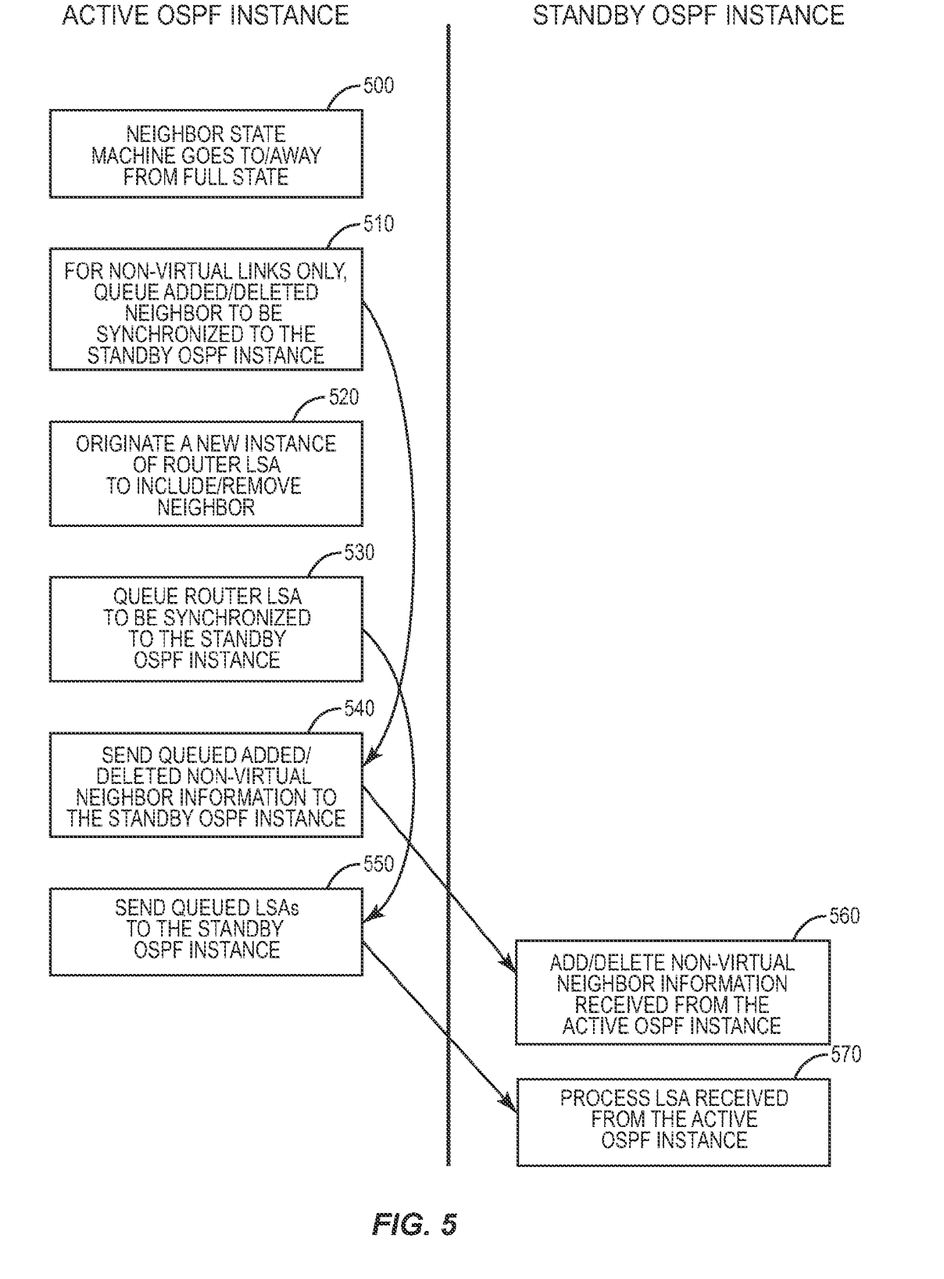
FIG. 5 is a diagram of an exemplary set of operations performed by an active OSPF instance and a standby OSPF instance prior to a switchover from the active OSPF instance to the standby OSPF instance according to one embodiment.

FIG. 5 is a diagram of an exemplary set of operations performed by an active OSPF instance and a standby OSPF instance prior to a switchover from the active OSPF instance to the standby OSPF instance according to one embodiment. In FIG. 5, a first OSPF instance is the active OSPF instance (see, e.g., active OSPF instance 107A in FIG. 1) and a second OSPF instance is the backup OSPF instance (see, e.g., backup OSPF instance 107B in FIG. 1). In block 500, the neighbor state machine, such as neighbor state machine 115A in FIG. 1, goes to or away from a FULL state. Then, only for neighbors associated with non-virtual links, information relating to the added or deleted neighbor is placed in a queue for later synchronization with the standby OSPF instance (block 510). A FULL neighbor over a virtual link does not get synchronized to the standby OSPF instance in block 510. In addition, a new instance of the router LSA is originated to include or remove the neighbor (block 520). The new instance of the router LSA is queued to be synchronized to the standby OSPF instance (block 530). At some point in time, the queued added/deleted neighbor information from block 510 may be sent to the standby OSPF instance (block 540). In the embodiment shown in FIG. 5, the queue from which information is sent to the standby OSPF instance includes only information for non-virtual link neighbors. In addition, the queued LSAs from block 530 are sent to the standby OSPF instance (block 550). As seen in block 560, the standby OSPF instance then adds or deletes the non-virtual neighbor received from the active OSPF instance and stores the neighbor information in its neighbor data structure, such as the neighbor data structure containing the neighbor state machine 115B (see FIG. 1). Only the non-virtual link neighbors are received in block 560. Likewise, block 570 illustrates that the standby OSPF instance processes the LSAs sent from the active OSPF instance (block 550). In one embodiment, the received LSAs may be stored in a LSDB, such as LSDB 111B in FIG. 1.

In one embodiment, the sending of the neighbor information in block 540 may optionally include synchronizing the neighbor data structure of the first or active OSPF instance to the second or standby OSPF instance. In another embodiment, the method may include not synchronizing the neighbor data structure of the first OSPF instance to the second OSPF instance, or synchronizing the neighbor data structure of the first OSPF instance to the second OSPF instance only when the neighbor network element is a non-virtual neighbor.

In addition, in steps 560 and 570 in FIG. 5, the standby OSPF instance may optionally include creating a neighbor data structure for the second or standby OSPF instance based on the retrieved neighbor information, or updating a neighbor data structure for the second or standby OSPF instance based on the retrieved neighbor information.

Figure 6:
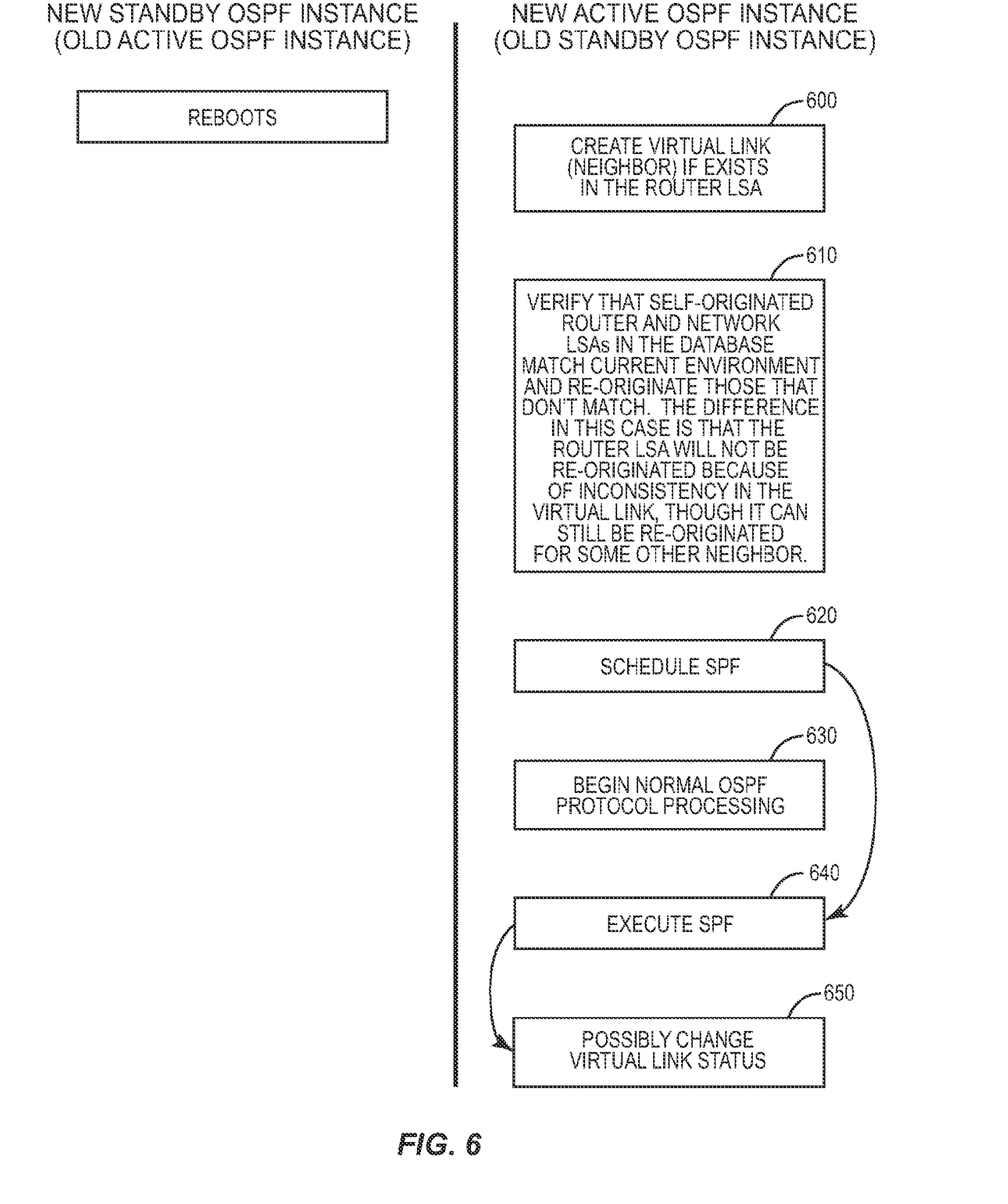
FIG. 6 is a diagram of an exemplary set of operations performed by an active OSPF instance and a standby OSPF instance after a switchover from the active OSPF instance to the standby OSPF instance according to one embodiment.

When a switch or other event happens to cause the standby OSPF instance to become the active OSPF instance, the previously active OSPF instance reboots and becomes the new standby OSPF instance, as seen in FIG. 6, and the former standby OSPF instance becomes active. FIG. 6 is a diagram of an exemplary set of operations performed by an active OSPF instance and a standby OSPF instance after a switchover from the active OSPF instance to the standby OSPF instance according to one embodiment. Once the former standby OSPF instance becomes active, it derives or creates a virtual link (neighbor) if it exists in the Router-LSA (block 600). In one embodiment, since the LSAs already have an established channel in the OSPF NSR communication, the standby OSPF instance can directly retrieve the virtual neighbor information from the OSPF Router LSA data structure 112B in its LSDB 111B. The new active OSPF instance verifies that the self-originated Router-LSA and the Network-LSAs in its LSDB 111B match the current environment, and re-originates those LSAs that do not match (block 610). For example, in one embodiment, if a virtual link (virtual neighbor) is no longer described in the Router-LSA, then the Router-LSA would be re-originated (block 600). The difference between the process shown in block 610 of this embodiment and the process shown in block 400 (FIG. 4) of the existing method is that the Router-LSA will not be re-originated because of an inconsistency in the virtual link between the network elements. However, it is noted that the Router-LSA can still be re-originated for some other neighbor.

In one embodiment, in the process described in FIG. 6, the second OSPF instance will go through the links described in a Router-LSA, pick out the virtual links (type 4 links as described in the OSPF 2 protocol RFC 2328, Appendix A.4.2), and create or update a neighbor data structure (see RFC 2328 Section 10) for the virtual link to be stored in the second or standby OSPF instance.

The standby OSPF instance may then proceed with scheduling the shortest path first (SPF) (block 620) and begin normal OSPF protocol processing (block 630). The SPF will be executed (block 640). In the normal course of OSPF, the status of the virtual link may change (block 650).

Figure 7:
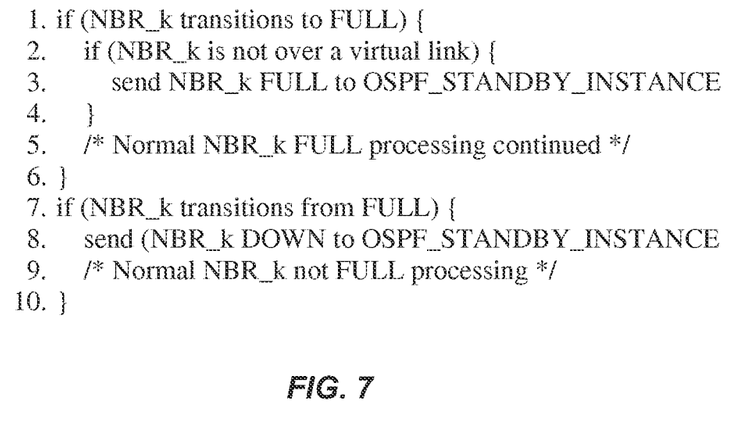
FIG. 7 is an exemplary piece of nonstop routing code demonstrating that a full neighbor over a virtual link is skipped when synchronizing neighbor information from the active OSPF instance to the standby OSPF instance.
Figure 8:
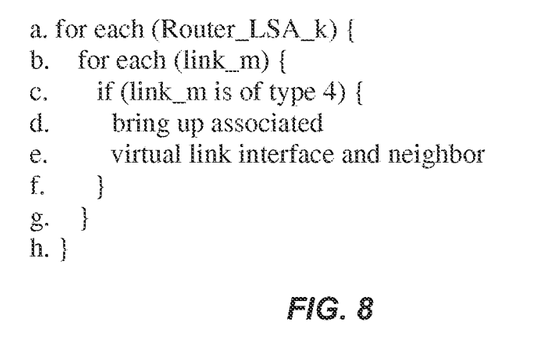
FIG. 8 is an exemplary piece of nonstop routing code demonstrating the decision to create a FULL neighbor over a virtual link using LSAs when the standby OSPF instance becomes active.

In one embodiment, the method shown in FIGS. 5 and 6 can be implemented by simple changes in existing NSR code. In one embodiment, the exemplary NSR code shown in FIGS. 7 and 8 may be used. FIG. 7 is an exemplary piece of nonstop routing code demonstrating that a full neighbor over a virtual link is skipped when synchronizing neighbor information from the active OSPF instance to the standby OSPF instance. FIG. 8 is an exemplary piece of nonstop routing code demonstrating the decision to create a FULL neighbor over a virtual link using Router-LSAs when the standby OSPF instance becomes active.

As discussed above with respect to block 510 of FIG. 5, a FULL neighbor over a virtual link does not get synchronized to the standby OSPF instance. This may be implemented via NSR code for an active OSPF instance, as seen in FIG. 7, lines 2-5, where a FULL neighbor over a virtual link does not get synchronized to the standby OSPF instance. Then, as seen for the code in FIG. 8, in the event that the standby OSPF instance assumes the role of the active OSPF instance, then the standby OSPF instance (now the new active OSPF instance) goes through each of its Router-LSAs to retrieve the relevant neighbor information. In one embodiment, the newly active OSPF instance may look for Router-LSA type 4 links (as described in OSPF protocol RFC 2328, Appendix A.4), which describe virtual links, and create the interface and FULL neighbor. In this manner, a link between the network element and a neighbor network element may be derived or created without having to synchronize the neighbor information between the original active OSPF instance and the standby OSPF instance which has become active. In one embodiment, the link may then be derived by creating or updating a link between the network element and the neighbor network element based on information associated with the Router-LSA type 4 links.

In one embodiment, deriving of the link in this embodiment may include deriving a virtual link between the network element and the neighbor network element. In one embodiment, the network element and the neighbor network element may be linked by a virtual link prior to the switch that causes the second OSPF instance to act as the active OSPF instance. In this embodiment, deriving the link may be accomplished by updating the virtual link that existed between the network element and the neighbor network element prior to the switch that causes the second OSPF instance to act as the active OSPF instance. In one embodiment, the method described above in FIGS. 5 and 6 may also include verifying the derived virtual link.

The process described above may be performed with respect to neighbors over a virtual link. In another embodiment, the network element and the neighbor network element are attached in a point-to-point configuration. In this embodiment, the process is similar to that described above with respect to FIGS. 5 and 6, except that if and when a switch causes the second or standby OSPF instance to act as the active OSPF instance, the second or standby OSPF instance searches the Router-LSAs in the LSDB of the second or standby OSPF instance for type 1 links that describe any links that include the network element. In one embodiment, the newly active OSPF instance may look for Router-LSA type 1 links (as described in OSPF protocol RFC 2328, Appendix A.4), and create the interface and FULL neighbor. In this manner, a link between the network element and a neighbor network element may be derived or created without having to synchronize the neighbor information between the original active OSPF instance and the standby OSPF instance which has become active. In addition, in one embodiment, a link may also be derived by creating or updating a link between the network element and the neighbor network element based on information associated with the Router-LSA type 1 links. However, the link may be created without deriving it from the Router-LSA since the physical point-to-point connection is known to the standby OSPF instance.

Because a neighbor over a virtual link transitions away from FULL only via a DOWN interface during shortest path first calculation (SPF), no additional changes on either the active or standby OSPF instance are necessary to bring down a virtual link.

By implementing the approach described herein, neighbor information may be retrieved from the Router-LSAs of the standby OSPF instance to derive or create a link between the network element and the neighbor network element based on the retrieved neighbor information. By reverse engineering the LSDB to obtain the neighbor and link information, a graph is constructed that is the basis of the link-state routing protocol. Using the Router-LSA in this fashion allows the network element to handle virtual links at the last possible moment, thereby minimizing the time that standby OSPF instance becomes active, which negates the need for synchronization of neighbors over virtual links. This in turn greatly reduces cleaning up data structures and reconciling different messages that come through at different times that nevertheless are related. Further, making use of the Route-LSA data in the described manner not only simplifies the NSR design and handling, it also avoids possible virtual neighbor flapping in existing solutions where right after a switchover the virtual neighbor records may not match the ones in the Router-LSA.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of operation of a network element for open shortest path first (OSPF) non-stop routing, wherein the network element comprises a first OSPF instance currently acting as an active OSPF instance and a second OSPF instance currently acting as a standby OSPF instance, the method comprising:
    attempting to create a FULL adjacency with a neighbor network element using a neighbor state machine of the active OSPF instance, the step of attempting comprising:
        maintaining a neighbor data structure for the neighbor network element prior to the neighbor state machine transitioning to or from a full state;
        installing link state advertisements (LSAs) received from the neighbor network element in both a link state database (LSDB) of the active OSPF instance and the standby OSPF instance; and
    if and when the neighbor state machine of the active OSPF instance transitions to the full state and if a switch causes the second OSPF instance to act as the active OSPF instance, retrieving virtual neighbor information from the LSAs of the second OSPF instance and deriving a virtual link between the network element and the neighbor network element based on the retrieved virtual neighbor information in order to create the FULL adjacency with the neighbor network element, and wherein the virtual link between the network element and the neighbor network element is derived without synchronizing the virtual neighbor information between the first OSPF instance and the second OSPF instance.

2. The method of claim 1 wherein the network element and the neighbor network element are linked by a virtual link prior to the switch that causes the second OSPF instance to act as the active OSPF instance.

3. The method of claim 2 wherein the deriving of the virtual link comprises updating the virtual link that existed between the network element and the neighbor network element prior to the switch that causes the second OSPF instance to act as the active OSPF instance.

4. The method of claim 1 further comprising synchronizing the LSAs of the first OSPF instance to the second OSPF instance if and when the neighbor state machine of the active OSPF instance transitions to exchange state or higher.

5. A method of operation of a network element for open shortest path first (OSPF) non-stop routing, wherein the network element comprises a first OSPF instance currently acting as an active OSPF instance and a second OSPF instance currently acting as a standby OSPF instance, the method comprising:
    attempting to create a FULL adjacency with a neighbor network element using a neighbor state machine of the active OSPF instance, the step of attempting comprising:
        maintaining a neighbor data structure for the neighbor network element prior to the neighbor state machine transitioning to or from a full state;
        installing link state advertisements (LSAs) received from the neighbor network element in both a link state database (LSDB) of the active OSPF instance and the standby OSPF instance;
    synchronizing the neighbor data structure of the first OSPF instance to the second OSPF instance only when the neighbor network element is a non-virtual neighbor; and
    if and when the neighbor state machine of the active OSPF instance transitions to the full state and if a switch causes the second OSPF instance to act as the active OSPF instance, retrieving neighbor information from the LSAs of the second OSPF instance and deriving a link between the network element and the neighbor network element based on the retrieved neighbor information in order to create the FULL adjacency with the neighbor network element.

6. The method of claim 1 wherein if and when a switch causes the second OSPF instance to act as the active OSPF instance, the second OSPF instance searches the Router-LSAs in the LSDB of the second OSPF instance for type 4 links that describe any virtual links that include the network element.

7. The method of claim 6, wherein the deriving the virtual link between the network element and the neighbor network element is based on information associated with the type 4 links.

8. The method of claim 7 further comprising creating a neighbor data structure for the second OSPF instance based on the retrieved virtual neighbor information.

9. The method of claim 7 further comprising updating a neighbor data structure for the second OSPF instance based on the retrieved virtual neighbor information.

10. The method of claim 7 further comprising verifying the derived virtual link.

11. The method of claim 1 wherein the network element and the neighbor network element are attached via a point-to-point interface.

12. The method of claim 11 wherein if and when a switch causes the second OSPF instance to act as the active OSPF instance, the second OSPF instance searches the Router-LSAs in the LSDB of the second OSPF instance for type 1 links that describe any links that include the network element.

13. The method of claim 12, wherein the deriving the virtual link further comprises creating or updating the link between the network element and the neighbor network element based on information associated with the Router-LSA type 1 links.

14. The method of claim 13 further comprising creating a neighbor data structure for the second OSPF instance based on the retrieved virtual neighbor information.

15. The method of claim 13 further comprising updating a neighbor data structure for the second OSPF instance based on the retrieved virtual neighbor information.

16. A network element for open shortest path first (OSPF) non-stop routing, comprising:
    a first OSPF instance currently acting as an active OSPF instance and a second OSPF instance currently acting as a standby OSPF, wherein each of the first and second OSPF instances comprise a link state database (LSDB) configured to store link state advertisements (LSAs) and a neighbor data structure comprising a neighbor state machine configured to maintain a neighbor data structure for a neighbor network element; and
    at least one processor configured to:
        attempt to create a FULL adjacency with a neighbor network element using a neighbor state machine of the active OSPF instance by:

maintaining a neighbor data structure for the neighbor network element prior to the neighbor state machine transitioning to or from a full state;

installing link state advertisements (LSAs) received from the neighbor network element in both a link state database (LSDB) of the active OSPF instance and the standby OSPF instance; and if and when the neighbor state machine of the active OSPF instance transitions to the full state and if a switch causes the second OSPF instance to act as the active OSPF instance, retrieve virtual neighbor information from the Router-LSAs of the second OSPF instance and derive a virtual link between the network element and the neighbor network element based on the retrieved virtual neighbor information in order to create the FULL adjacency with the neighbor network element, and wherein the virtual link between the network element and the neighbor network element is derived without synchronizing the virtual neighbor information between the first OSPF instance and the second OSPF instance.

17. The network element of claim 16 wherein the network element is linked to the neighbor network element by a virtual link prior to the switch that causes the second OSPF instance to act as the active OSPF instance.

18. The network element of claim 17 wherein the processor is further configured to update the virtual link that existed between the network element and the neighbor network element prior to the switch that causes the second OSPF instance to act as the active OSPF instance.

19. The network element of claim 16 wherein the processor is further configured to synchronize the LSAs of the first OSPF instance to the second OSPF instance if and when the neighbor state machine of the active OSPF instance transitions to exchange state or higher.

20. A network element for open shortest path first (OSPF) non-stop routing, comprising:

a first OSPF instance currently acting as an active OSPF instance and a second OSPF instance currently acting as a standby OSPF, wherein each of the first and second OSPF instances comprise a link state database (LSDB) configured to store link state advertisements (LSAs) and a neighbor data structure comprising a neighbor state machine configured to maintain a neighbor data structure for a neighbor network element; and at least one processor configured to:

attempt to create a FULL adjacency with a neighbor network element using a neighbor state machine of the active OSPF instance by:

maintaining a neighbor data structure for the neighbor network element prior to the neighbor state machine transitioning to or from a full state;

installing link state advertisements (LSAs) received from the neighbor network element in both a link state database (LSDB) of the active OSPF instance and the standby OSPF instance;

synchronize the neighbor data structure of the first OSPF instance to the second OSPF instance only when the neighbor network element is a non-virtual neighbor; and, if and when the neighbor state machine of the active OSPF instance transitions to the full state and if a switch causes the second OSPF instance to act as the active OSPF instance, retrieve neighbor information from the Router-LSAs of the second OSPF instance and derive a link between the network element and the neighbor network element based on the retrieved neighbor information in order to create the FULL adjacency with a neighbor network element.

21. The network element of claim 16 wherein if and when a switch causes the second OSPF instance to act as the active OSPF instance, the second OSPF instance searches the Router-LSAs in the LSDB of the second OSPF instance for type 4 links that describe any virtual links that include the network element.

22. The network element of claim 21, wherein the processor is further configured to derive the virtual link between the network element and the neighbor network element based on information associated with the Router-LSA type 4 links.

23. The network element of claim 22 wherein the processor is further configured to create a neighbor data structure for the second OSPF instance based on the retrieved virtual neighbor information.

24. The network element of claim 22 wherein the processor is further configured to update a neighbor data structure for the second OSPF instance based on the retrieved virtual neighbor information.

25. The network element of claim 22 wherein the processor is further configured to verify the derived virtual link.

26. The network element of claim 16 wherein the network element is attached to the neighbor network element in a point-to-point configuration.

27. The network element of claim 26 wherein if and when a switch causes the second OSPF instance to act as the active OSPF instance, the second OSPF instance searches the Router-LSAs in the LSDB of the second OSPF instance for type 1 links that describe any links that include the network element.

28. The network element of claim 27, wherein the processor is further configured to create or update the link between the network element and the neighbor network element based on information associated with the Router-LSA type 1 links.

29. The network element of claim 27 further comprising creating a neighbor data structure for the second OSPF instance based on the retrieved virtual neighbor information.

30. The network element of claim 27 further comprising updating a neighbor data structure for the second OSPF instance based on the retrieved virtual neighbor information.

* * * * *

UNITED STATES PATENT AND TRADEMARK OFFICE
CERTIFICATE OF CORRECTION

| | |
|---|---|
| PATENT NO. | : 8,913,485 B2 |
| APPLICATION NO. | : 13/350234 |
| DATED | : December 16, 2014 |
| INVENTOR(S) | : Lu et al. |

Page 1 of 1

It is certified that error appears in the above-identified patent and that said Letters Patent is hereby corrected as shown below:

On the Title Page, Illustrative Figure, for Tag "240", Line 1, delete "THE A" and insert -- A --, therefor.

In the Drawings

In Fig. 2, Sheet 2 of 7, for Tag "240", in Line 1, delete "THE A" and insert -- A --, therefor.

In Fig. 7, Sheet 7 of 7, delete "(NBR_ k DOWN" and insert -- NBR_k DOWN --, therefor.

In the Specification

In Column 4, Line 26, delete "(IGP)" and insert -- (IGP)) --, therefor.

In the Claims

In Column 17, Line 53, in Claim 20, delete "state:" and insert -- state; --, therefor.

Signed and Sealed this
Fourteenth Day of July, 2015

Michelle K. Lee
*Director of the United States Patent and Trademark Office*